March 31, 1925.  1,531,376

E. R. CHINBERG ET AL

BELT FASTENER

Filed March 18, 1921

Inventors:
Edgar R. Chinberg,
Harry R. Pennington,

By Sheridan, Jones, Sheridan & Smith
ATTORNEYS.

Patented Mar. 31, 1925.

1,531,376

UNITED STATES PATENT OFFICE.

EDGAR R. CHINBERG AND HARRY R. PENNINGTON, OF CHICAGO, ILLINOIS.

BELT FASTENER.

Application filed March 18, 1921. Serial No. 453,520.

*To all whom it may concern:*

Be it known that we, EDGAR R. CHINBERG, a citizen of the United States, residing at Chicago, in the county of Cook and State of Illinois, and HARRY R. PENNINGTON, a citizen of the United States, residing at Chicago, in the county of Cook and State of Illinois, have invented certain new and useful Improvements in Belt Fasteners, of which the following is a specification.

This invention relates to an improved method of an apparatus for joining the free ends of driving or power belts.

Heretofore it has been common practice to join the ends of driving belts and the like by means of metal fasteners of various types. In most cases these fasteners are flat while in some cases they are curved to conform to the contour of the pulleys over which the belt operates. In the use of either of these types there is a tendency for the bending or flexing stresses in the vicinity of the fastener to localize along the transverse lines defined by the ends of said fastener, which tendency in a comparatively short period of service invariably results in the belt cracking or breaking along these lines making it necessary to repair or replace same. This cracking or breaking of the belt occurs more frequently in the use of long fasteners than in the use of those of the shorter varieties by reason of the fact that in the former the angle of bend between the portion of the belt which is rendered stiff by the fastener and the free or flexible portion thereof is greater or more pronounced than that occurring in the use of the shorter fasteners. However, the injury to the belt is caused in both cases and occurs so frequently as to render the use of these metal fasteners objectionable. Furthermore, the short fasteners are not suitable for many classes of work due to the fact that the rivets or other fastening means tend to pull out of the belt owing to their close proximity to the joint.

One object of the present invention is to provided a belt fastener which shall be pliant or flexible and thus capable of remaining flat during its passage between the pulleys over which the belt is operating and conforming to the contour of said pulleys when passing over the latter. Another object is the provision of a pliant or flexible belt fastener reinforced along the portion thereof which lies in the immediate vicinity of the joint. Another object is to provide a fastener the ends of which are of such contour as to cause a distribution of the bending or flexing stresses over a substantial area, thus preventing localization thereof and possible cracking of the belt as above described.

Other objects and advantages will be apparent from the following description taken in connection with the accompanying drawings, wherein several forms of the invention are illustrated.

Figure 1:
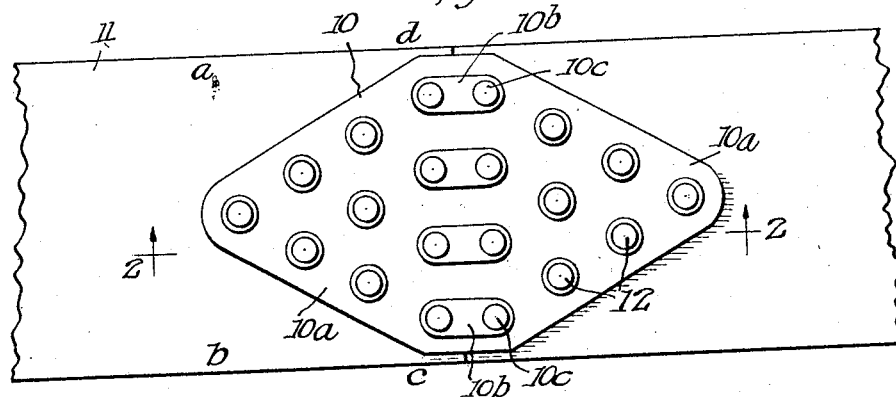
Figure 1 is a top plan view of one form of fastener constructed in accordance with the present invention, the same being shown in operative position at the ends of a belt.
Figure 2:
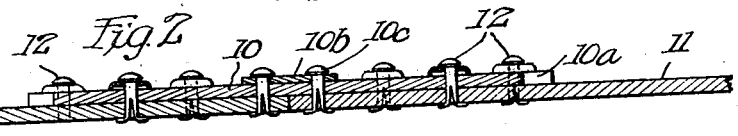
Fig. 2 is a section on the line 2—2 of Fig. 1.

Referring more in detail to the drawings and more particularly to the form shown in Figs. 1 and 2 thereof, the fastener is designated in its entirety as 10 and comprises a pliant or flexible strap 10$^a$ of substantially diamond shape in design. This strap 10$^a$ is shown in operative position joining the two ends of the belt 11. The strap 10$^a$ is secured in position by means of suitable headed rivets 12, the latter being preferably of the split shank type so as to be self-clinching when driven through the strap and belt against a hard surface such as the face of a pulley. In practice it is preferred to form the rivet holes in the strap 10$^a$ at the time the same is made so that when said strap is applied to a belt the rivets may be inserted in these holes and driven through the belt into final clinched position. If desired, the rivet holes in the strap 10$^a$ may be bushed with eyelets or the like. In order to facilitate the withdrawal of the rivets in the event repair or replacement of the strap 10$^a$ should become necessary, it is preferred to form the rivet heads in such wise as to enable the same to be readily gripped by means of pliers or the like. This result may be obtained by providing the rivets with specially shaped heads or, as shown in the drawings, by providing the same with ordinary heads and interposing a washer between the latter and the upper face of the strap 10$^a$ when the rivets are applied. By dishing the washers in the latter case, or the heads of the rivets in the former, the strap 10a will be more effectively gripped by the rivets and over a larger area, and the pulling strains will be more widely distributed.

Disposed on the strap 10a and along the line where the two ends of the belt come together are a plurality of metal strips or reinforcing elements 10b adapted to be secured in position by means of rivets 10c. It is preferred in practice to make the strap 10a of material which possesses less elasticity than the material of which the belt is made so that the strain at the joint is taken substantially entirely by the strap, thus relieving the strain on the strips 10b and reducing to a minimum the possibility of the rivets which hold said strips in place pulling out of the belt.

As shown, the strap 10a in Fig. 1 of the drawings is of substantially diamond shape, this being for the purpose of distributing the bending or flexing stresses over a substantial area on either side of the joint. In other words, this design prevents localization of these stresses along any given line but on the other hand distributes the same over substantially the entire area a—b—c—d (Fig. 1), thus overcoming all possibility of the belt cracking or breaking, such as would be the tendency if the ends of the strap 10a were cut square with the belt.

Figure 3:
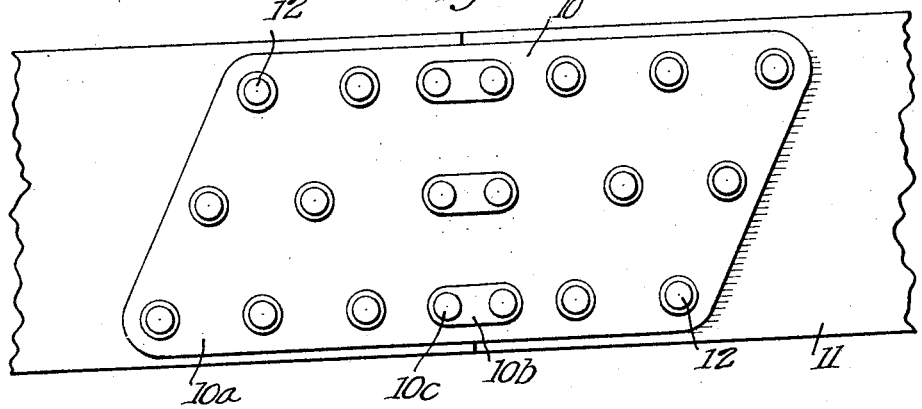
Fig. 3 is a top plan view similar to Fig. 1, showing a slightly different form of the invention.
Figure 4:
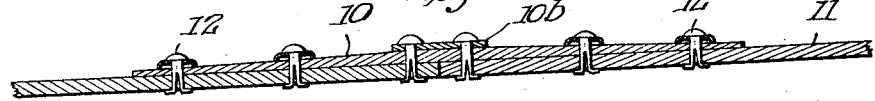
Fig. 4 is a sectional view of another form of the invention.

In Fig. 3 another shape or design of strap is illustrated. In this form a distribution of the bending stresses is obtained by cutting the ends of the strap along parallel lines inclined with respect to the center line of the belt. In Fig. 4 a further form of the invention is illustrated wherein the strap 10a is made to taper from the center portion outwardly in both directions. The strap 10a in Fig. 1 for instance, might be formed as shown in this figure (Fig. 4) or if desired, the strap of Fig. 4 might be of rectangular form having its ends cut square with the belt, the tapered formation overcoming the possibility of the belt cracking or breaking along the lines defined by the ends of such strap. In the forms of the invention illustrated in Figs. 1 to 3, inclusive, it will be observed that the bending stresses are distributed longitudinally of the belt over a considerable area by cutting the ends of the strap at an incline or in other words by inclining the normal lines of stress localization. Obviously many other shapes may be designed by which the same result would be obtained.

It has been observed in the use of belt fasteners of the type herein illustrated that better contact with the pulley at the belt joint is obtained, and the possibilities of the belt cracking or breaking or of the rivets pulling out are reduced to a minimum and the life of the belt thereby greatly increased.

It will be obvious to those skilled in the art that the present invention is susceptible of various changes and modifications without departing from the spirit of the invention and it is not therefore desired to limit the same to the particular forms or arrangement shown in the drawings except where limitations appear in the appended claim.

What we claim is:

The combination with a belt, of a fastener adapted to secure the ends thereof together, said fastener comprising a piece of pliant material spanning the belt joint and overlying the adjacent ends of the belt a substantial distance, metallic links appreciably shorter than said piece of material mounted on the latter immediately over said joint, fastening members extending through said links, said material and said belt, and other fastening members extending through said material and belt between said links and the ends of said material, said material having substanitally the same flexibility as that of said belt but being of less elasticity whereby to relieve all undue strain on said first named fastening members.

In testimony whereof, we have subscribed our names.

EDGAR R. CHINBERG.
HARRY R. PENNINGTON.